(12) United States Patent
Bonora et al.

(10) Patent No.: US 9,834,378 B2
(45) Date of Patent: Dec. 5, 2017

(54) LOADER AND BUFFER FOR REDUCED LOT SIZE

(75) Inventors: Anthony C. Bonora, Portola Valley, CA (US); Roger G. Hine, Menlo Park, CA (US); Theodore W. Rogers, Alameda, CA (US)

(73) Assignee: Brooks Automation, Inc., Chelmsford, MA (US)

( * ) Notice: Subject to any disclaimer, the term of this patent is extended or adjusted under 35 U.S.C. 154(b) by 2338 days.

(21) Appl. No.: 11/644,240

(22) Filed: Dec. 22, 2006

(65) Prior Publication Data

US 2008/0152466 A1    Jun. 26, 2008

(51) Int. Cl.
H01L 21/677   (2006.01)
B65G 1/04     (2006.01)
B65G 37/02    (2006.01)

(52) U.S. Cl.
CPC ............ *B65G 1/0407* (2013.01); *B65G 37/02* (2013.01); *B65G 2201/0297* (2013.01)

(58) Field of Classification Search
USPC ................................ 414/217, 411, 939, 940
See application file for complete search history.

(56) References Cited

U.S. PATENT DOCUMENTS

| 6,042,324 | A   | 3/2000  | Aggarwal et al. |
| 6,223,886 | B1  | 5/2001  | Bonora et al. |
| 6,283,692 | B1  | 9/2001  | Perlov et al. |
| 6,364,593 | B1  | 4/2002  | Hofmeister et al. |
| 6,494,308 | B2  | 12/2002 | Bonora et al. |
| 6,506,009 | B1  | 1/2003  | Nulman et al. |
| 6,612,797 | B1* | 9/2003  | Bonora et al. ............... 414/217 |
| 6,955,197 | B2  | 10/2005 | Elliott et al. |
| 6,955,517 | B2  | 10/2005 | Nulman et al. |
| 7,134,826 | B2  | 11/2006 | Mitsuyoshi |
| 7,234,908 | B2  | 6/2007  | Nulman et al. |
| 7,419,346 | B2* | 9/2008  | Danna et al. ............ 414/222.11 |
| 2001/0008201 | A1 | 7/2001 | Bonora et al. |

(Continued)

FOREIGN PATENT DOCUMENTS

| JP | 2003524544 | 8/2003 |
| JP | 2003536247 | 12/2003 |

(Continued)

OTHER PUBLICATIONS

English translation of pertinent part (Search Report) of Notification of Examination Opinions, dated Jan. 18, 2012 from Taiwan Patent Application No. 96144963 (1 page).

*Primary Examiner* — Saul Rodriguez
*Assistant Examiner* — Willie Berry, Jr.
(74) *Attorney, Agent, or Firm* — Martine Penilla Group, LLP

(57) ABSTRACT

A system comprising a load port and a transfer module. In one embodiment, the load port includes a plate having a first opening and a second opening, a first workpiece access port, a second workpiece access port and at least one storage location. The storage location(s) may be located either beneath the second workpiece access port or above the first workpiece access port. The transfer mosule, which is located adjacent the load port, includes a load arm for moving the workpiece containers between the first workpiece access port, the second workpiece access port, any of the storage shelves and a material transport system.

16 Claims, 10 Drawing Sheets

(56) References Cited

U.S. PATENT DOCUMENTS

| | | |
|---|---|---|
| 2002/0108842 A1 | 8/2002 | Bonora et al. |
| 2002/0187024 A1* | 12/2002 | Nulman ........................ 414/217 |
| 2003/0031539 A1 | 2/2003 | Nulman et al. |
| 2003/0099527 A1 | 5/2003 | Mitsuyoshi |
| 2005/0036856 A1 | 2/2005 | Yamashita |
| 2006/0029489 A1 | 2/2006 | Nulman et al. |
| 2007/0237609 A1 | 10/2007 | Nulman et al. |

FOREIGN PATENT DOCUMENTS

| | | |
|---|---|---|
| KR | 1020050044531 | 5/2005 |
| TW | 200502151 | 1/2005 |
| TW | 200513426 | 4/2005 |

* cited by examiner

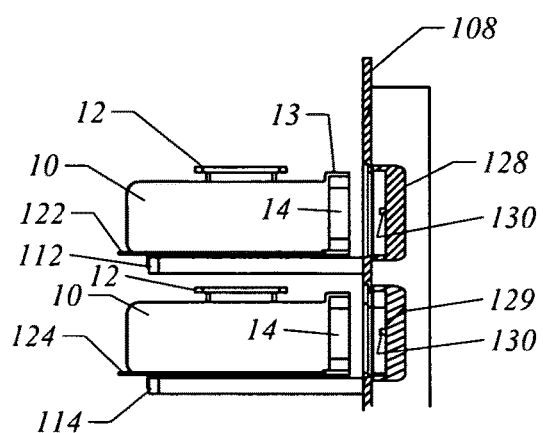
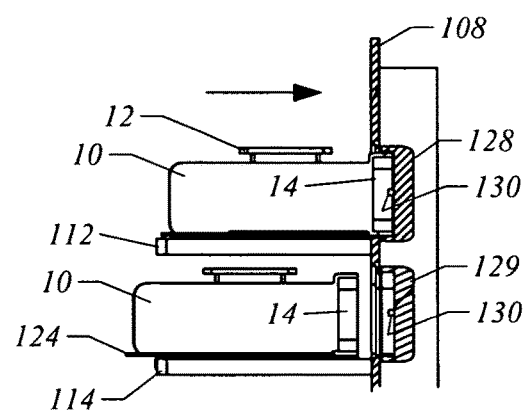
FIG. 3A  FIG. 3B
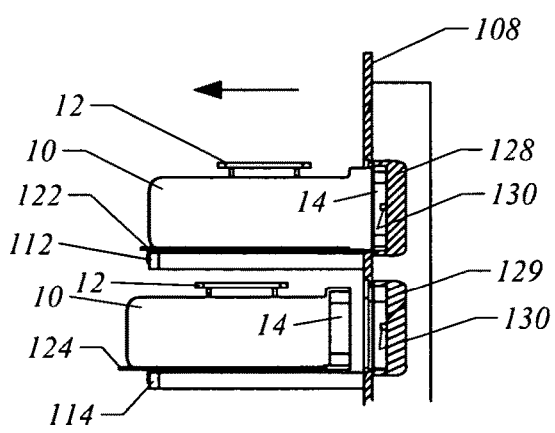
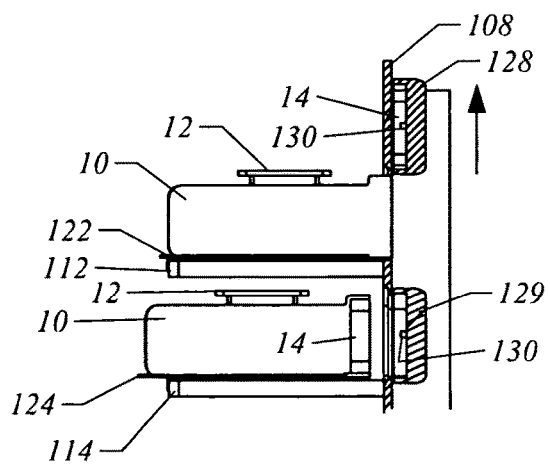
FIG. 3C  FIG. 3D

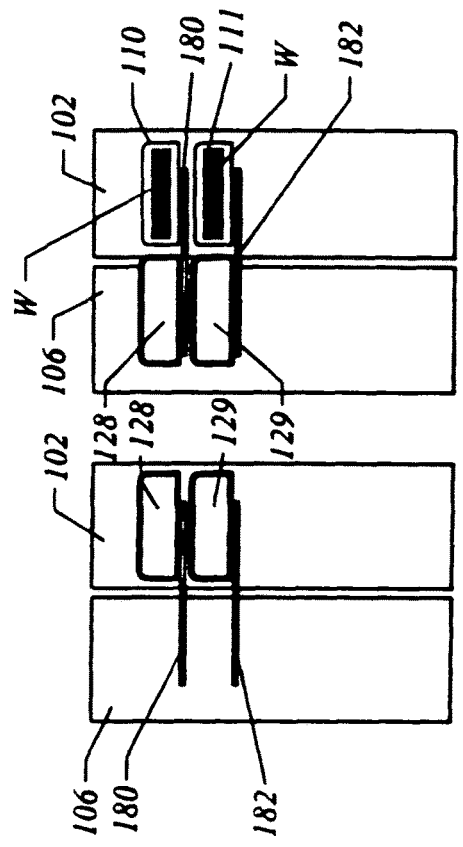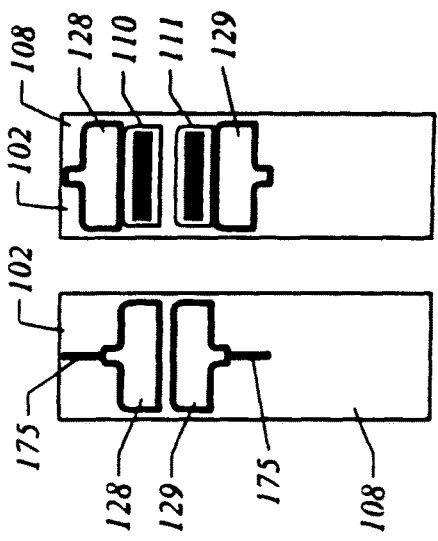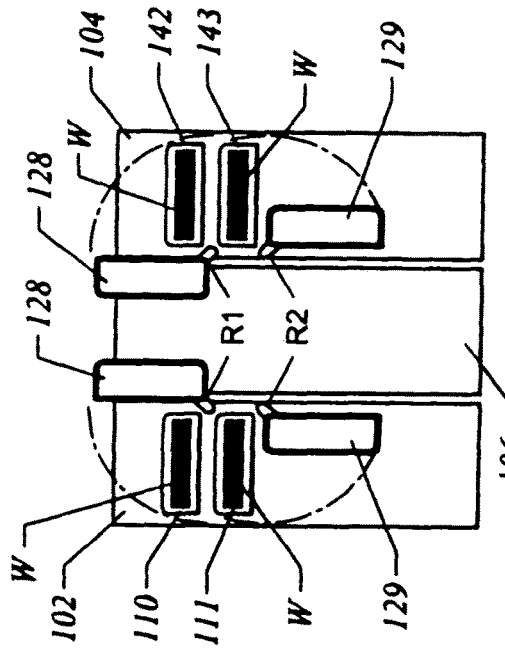

LOADER AND BUFFER FOR REDUCED LOT SIZE

CROSS REFERENCE TO RELATED APPLICATIONS

The present application is related to the following commonly-assigned, co-pending U.S. patent applications, each of which is hereby incorporated by reference herein in its entirety:

U.S. application Ser. No. 11/064,880, entitled "Direct Tool Loading," which was filed with the U.S. Patent & Trademark Office on Feb. 24, 2005;

U.S. application Ser. No. 11/177,645, entitled "Direct Tool Loading," which was filed with the U.S. Patent & Trademark Office on Jul. 8, 2005; and U.S. application Ser. No. 11/484,218, entitled "Belt Conveyor for use with Semiconductor Containers," which was filed with the U.S. Patent & Trademark Office on Jul. 10, 2006.

FIELD OF THE INVENTION

The present invention generally comprises a load port. More specifically, the present invention comprises a load port that, in addition to opening containers and presenting the wafer to a processing tool, may also store or buffer one or more containers.

BACKGROUND OF THE INVENTION

Conventional semiconductor manufacturing facilities handle 300 mm wafers transport containers that typically store twenty-five wafers per container. These containers are commonly referred to as Standard Mechanical Interface (SMIF) pods or Front Opening Universal Pods (FOUPs). The various processing tools, stockers and material handling systems within the fabrication facility are designed to operate with these 300 mm SMIF pods and FOUPs.

After a load port opens the FOUP and makes the wafers within the FOUP accessible, the processing tool processes all the wafers stored in the FOUP. The FOUP will not be removed from the load port until all the wafers are processed and the FOUP door is replaced. Thus, the cycle time for each FOUP is dependent on the number of wafers stored in the FOUP. Improvements in factory cycle time can be gained by reducing lot size of each FOUP from twenty-five wafers per FOUP to, for example, six wafers per FOUP.

However, tool starvation becomes a bigger problem when utilizing smaller lot FOUPs. The time for the material transport system to remove a completed pod and replace it with a new one must be much faster, or else the tool will sometimes have to wait to receive material to processes. One solution to help minimize the time a processing tool sits idle is to buffer FOUPs in a storage location located near the processing tool (often referred to a "stocker"). Stockers, however, occupy valuable facility floor space. For very high throughput tools, even local stockers (e.g., within the tool bay) may not be fast enough to prevent some tools from sitting idle. This is especially true of tools that only have two load ports. The time to process all the wafers stored in a six wafer FOUP may still be shorter than the time it takes for the system to transport a new FOUP to the tool—even from a nearby storage location. This means that the tool cannot process wafers any faster than the speed of the material transport system.

Therefore, it is desirable to be able to send pods directly from tool to tool, rather than moving through a stocker. This reduces the number of transport moves in the facility, which reduces cycle time and increase throughput. Generally, in order to be able to move FOUPs directly from tool to tool, the tools themselves must have the ability to buffer FOUPs at the tool, which would allow a FOUP to arrive at the tool before the processing tool finishes processing the wafers in the current FOUP, and vice versa.

Therefore, there is a need for a load port to have the ability to store FOUPs while the wafers stored in one or more FOUPs are being processed.

SUMMARY OF THE INVENTION

One aspect of the present invention is to provide container buffering or storage locally at the processing tool. In one embodiment of the invention, a load port includes two wafer access locations whereby a workpiece stored in the container may be accessed and at least one storage location. A transfer module, located adjacent the load port, transports containers between the wafer access locations and the storage location(s). In another embodiment, a system, including one or more storage columns, is located proximate to a processing tool having conventional load ports. The storage columns include multiple storage locations for buffering containers until one of the conventional load ports is available to accept a new container. The system preferably includes a transfer module for transferring containers between the storage locations and to/from a material transport system that transports containers between the system and the processing tool.

Another aspect of the present invention is to simplify the container opening functions of a conventional load port. In one embodiment, whereby the system operates with containers having a mechanically openable door, the port door of a wafer each access location unlocks and removes the container door from the container. The port door, with the container door coupled to it, must then move to allow access to the workpiece(s) stored in the container. In one embodiment, the port door rotates between a closed position and an open position. In another embodiment, a link-arm mechanism moves the port door vertically along a linear path between a closed position and an open position. In yet another embodiment, a mechanism moves the port door horizontally along a linear path between a closed position and an open position.

Yet another aspect of the present invention is to enable small-capacity containers (e.g., containers for storing less than 25 workpieces) to be accessed by a container transport mechanism that may also transport a conventional 300 mm FOUP. In one embodiment, the container transport mechanism includes a gripper that secures to the top handle of the container. In another embodiment, the gripper secures to the pair of side handles of the container.

Still another aspect of the present invention is to provide a modular system that may operate with conventional 300 mm production equipment and scale to meet the requirements of 450 mm wafer production. In one embodiment, a load port includes a plate that secures to a front end of a processing tool. The plate includes an opening, at least one workpiece access location and at least one storage location. The opening, access locations and storage locations may be scaled to accommodate any size container (e.g., 300 mm container, 450 mm container, conventional FOUP, etc.). For example, if a processing tool is to be converted from operating with a conventional FOUP to operating with small-capacity containers, the conventional load port may be removed from the processing tool and a load port according to the present invention, may be secured to the front end of the processing tool in its place. No other elements of the processing tool (e.g., wafer handling robot) have to be modified to "retrofit" to tool.

Another aspect of the present invention is to provide container buffering and storage proximate to a processing tool including a conventional load port. In one embodiment, a system is operably connected to a processing tool by a material transport system. The system includes one or more storage columns and a transfer module, which provides an interface to the material transport system. In addition to moving containers between the storage locations, the transfer module also loads and unloads containers from the material transport system.

BRIEF DESCRIPTION OF THE DRAWINGS

FIGS. 3A-3D are side partial cut-away views of a container motion sequence, according to one embodiment of the present invention;

FIGS. 8A-8B are schematic rear views of an embodiment of a door mechanism;

FIGS. 9A-9B are schematic views of an yet another embodiment of a door mechanism;

FIGS. 10A-10B are schematic views of still another embodiment of a door mechanism;

DETAILED DESCRIPTION OF THE INVENTION

Semiconductor Equipment and Materials International (SEMI) has created standards for semiconductor wafer manufacturing equipment (see http://www.semi.org). The SEMI Standards govern acceptable tolerances and interfaces for semiconductor manufacturing equipment. For purposes of describing this invention, only load ports for handling small-capacity containers will be referenced herein. The inventions described herein are not, however, limited to semiconductor manufacturing equipment or small-capacity containers.

By way of example only, the various embodiments of the present invention may also be used and/or adapted for systems handling SMIF pods, reticle containers, flat panel display transport devices, or any other container or processing tool. Container is defined as any type of structure for supporting an article including, but not limited to, a semiconductor substrate. By way of example only, a container includes a structure that comprises an open volume whereby the article can be accessed (e.g., FPD transport) or a container having a mechanically openable door (e.g., bottom opening SMIF pod, FOUP).

Figure 1:
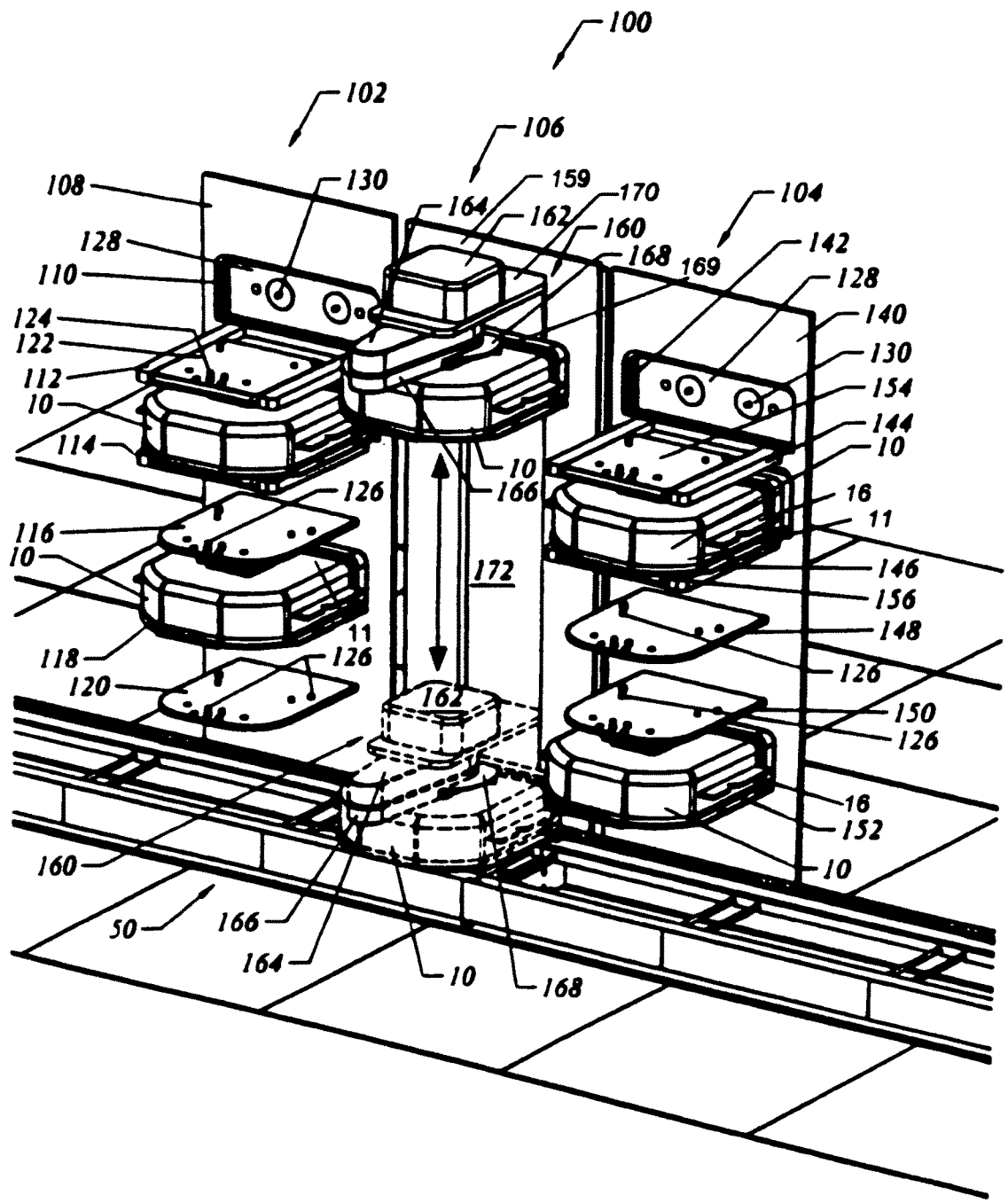
FIG. 1 is a perspective view of an embodiment of the present invention.

FIG. 1 illustrates one embodiment of a system 100 in operation with small capacity containers 10. Each small capacity container 10 includes a container shell 11, a top handle 12, a container door 14, and a pair of side handles 16. A conventional FOUP may store up to twenty-five semiconductor wafers. Each small capacity container 10 is designed to store less semiconductor wafers than a conventional FOUP. The specific number of wafers that may be stored in a small capacity container 10 may vary.

In this embodiment, the system 100 comprises a "3 wide" system that includes a first load port 102, a second load port 104 and a transfer module 106 located between the first load port 102 and the second load port 104. The first and second load ports 102, 104 and the transfer module 106 are preferably the same dimension and shape as a conventional Box Opener/Loader-to-Tool Standard Interface (BOLTS) compatible load port, which is well known and widely used within the semiconductor industry. If the load ports 102, 104 and the transfer device 106 conform to the BOLTS standard set by SEMI, a process tool that includes conventional load ports may be easily "retrofitted." For example, if the process tool includes three load ports, the three conventional load ports may be removed from the process tool and the system 100 may secured to the process tool in place therein. No other elements of the process tool (e.g., wafer handling robot) must be modified to operate with the system 100. Of course, the plate 108 of the load port 102, the plate 140 of the load port 104, and the plate of the transfer module 106, may comprise other dimensions and are not required to conform to the BOLTS Standard.

FIG. 1 illustrates that the first load port 102 includes two wafer access locations and three storage locations. The load port 102 includes, among other things, a plate 108 having a first opening 110 and a second opening (not visible), a first container advance shelf 112, a second container advance shelf 114, a first storage shelf 116, a second storage shelf 118 and a third storage shelf 120. Each container advance shelf and storage shelf shown in FIG. 1 includes a registration feature such as kinematic pins 126. The container advance shelves and storage locations may include other registration features, and the registration features do not have to be similar. The container advance shelves and storage locations may also include other features, such as a sensor for detecting when a container 10 is seated on the shelf or located in a particular storage location. Such a feature would help prevent collisions between containers (e.g., the container transport mechanism 160 will not attempt to place a container 10 on a shelf that is already occupied by another container 10).

The wafer access locations of the load port 102, in general, support a container 10 and remove the container door such that the wafers stored in the container 10 are accessible through one of the openings in the plate 108. In FIG. 1, the first wafer access location includes a shelf 112 and a port door 128. In this embodiment, the shelf 112 comprises a container advance plate 122 for moving the container 10 towards and away from the opening 110 in the plate 108. The port door 128 unlocks the container door 14, couples the container door to the port door 128 and removes the container door 14 (described in more detail later) so that the wafers stored in the container may be accessed through the opening 110.

The second wafer access location in the load port 102 includes the container advance shelf 114 and a port door 129

(not visible). In this embodiment, the shelf 114 comprises a container advance plate 124 for moving the container 10 towards and away from the opening 111 in the plate 108. The port door 129 is similar to the port door 128 described above. The port doors 128 and 129 shown in FIG. 1 each include a pair of latch keys 130 for opening and closing the container door 14 and retaining the container door 14 against the port door. One example of such a port door is disclosed in U.S. Pat. No. 6,502,869 entitled "Pod Door to Port Door Retention System," which is assigned to Asyst Technologies, Inc., and is incorporated in its entirety herein by reference.

FIG. 1 illustrates that the load port 102 includes three storage locations. A storage location preferably comprises a passive storage area that does not provide any means for accessing the wafers stored within the container seated in the storage location. In this embodiment, each storage location comprises a shelf for supporting a container 10. The load port 102 includes three storage shelves 116, 118 and 120, each having kinematic pins 126 for registering with the corresponding features of the container 10. As will be described in more detail later, the load port 102 may include any number of storage locations, and may include additional storage locations located above the opening 110. FIG. 1 illustrates a container 10 seated on the shelf 118, while the shelves 116 and 120 are empty.

SEMI Standard E15.1, *Specification for Tool Load Port*, specifies that the horizontal datum plane, which generally correlates with the container advance plate of a load port, shall be located approximately 900 mm from the facility floor. Wafers stored in a 300 mm FOUP, seated on the container advance plate, are accessible at an elevation measured between 44 mm and 284 mm above the horizontal datum plane. The wafer handling robot located within the Equipment Front End Module (EFEM) or processing tool is able to access any of the wafers stored in the FOUP.

FIG. 1 illustrates the system 100 in operation with small-capacity container 10. The container advance shelves 112 and 114 are preferably positioned such that a processing tool could be "retrofitted" with the system 100 and a wafer handling robot within the process tool or EFEM may access wafers stored in both the container seated on the shelf 112 and the container seated on shelf 114. In one embodiment, the shelf 112 is positioned at 900 mm from the facility floor and the shelf 114 is positioned at 1090 mm from the facility floor. At these two elevations, the containers 10 seated on the shelves 112 and 114 occupy substantially the same height as a conventional 300 mm FOUP seated on a conventional load port. Thus, the wafers stored in the two containers seated on shelves 112 and 114 are accessible at an elevation measured between 44 mm and 284 mm above the horizontal datum plane—the same elevations as if the wafers were stored in a conventional 300 mm FOUP. Accordingly, the wafer handling robot does not have to be modified at all to operate with the system 100. If the container 10 comprises, for example, a single wafer interface (SWIF) container, then it is within the scope of the invention for more than two wafer access locations to occupy the same elevation as a conventional 300 mm FOUP.

The load port 102 includes three storage locations 116, 118 and 120 located below the container advance shelf 114. FIG. 1 illustrates that each storage location is horizontally aligned with each other. The load port 102 may also include additional storage locations above the plate opening 110 for additional storage capacity (see FIGS. 11-12). If the load port 102 includes these additional storage locations, the z stroke of the container transfer mechanism 160 (described in more detail later) would have to be increased so that the container transfer mechanism 160 may access the additional storage locations.

The load port 104 shown in FIG. 1 also includes two wafer access locations and three storage locations. The load port 104 includes, among other things, a plate 140 having a first opening 142 and a second opening 143, a first container advance shelf 144, a second container advance shelf 146, a first storage location 148, a second storage location 150 and a third storage location 152. Each container advance shelf and storage location on the load port 104 includes a registration feature, such as kinematic pins 126. The container advance shelves and storage locations may include other registration features.

The load port 104 also includes a first port door 128 for controlling access through the first opening 142 and a second port door 129 for controlling access through the second opening 143. The port doors 128 and 129 shown in FIG. 1 each include a pair of latch keys 130 for opening and closing the container door 14 and coupling the container door 14 to the port door.

FIG. 1 also illustrates that the system 100 includes a transfer module 106. The transfer module includes a plate 159 and a container transport mechanism 160. FIG. 1 illustrates that the plate 159 is similar to the plates 108, 140 of the load ports 102, 104, except that the plate 159 includes a track 172. The container transport mechanism 160 is for moving containers 10 between the load port 102, the load port 104 and the material transport system 50. In this embodiment, the mechanism 160 includes a shoulder 162, an upper link arm 164, a lower link arm 166 and a gripper 168. One such mechanism is Asyst Technologies, Inc.'s AXYS robot.

The shoulder 162 is operably coupled with a carriage 170 that travels within the track 172. The carriage 170, which moves vertically along a z-axis (see FIG. 2), may be driven by a ball screw, belt, cable hoist, rack and pinion device or any other linear drive method. The area that the container transfer mechanism 160 travels within is referred to as the container Z travel zone.

FIG. 1 illustrates the container transfer mechanism 160 in two different positions: a raised position and a lowered position (shown in hidden lines). In the raised position, the mechanism 160 may access the container advance shelf 112 of the first load port 102 and the container advance shelf 144 of the second load port 104. In the lowered position, the mechanism 160 may lift a container 10 from the material transport system 50 or place a container 10 on the material transport system 50. The mechanism 160 may, of course, stop anywhere in between the raised and lowered positions.

FIG. 1 illustrates the system 100 in operation with a floor-based material transport system 50 for moving the containers 10 throughout the fabrication facility or within a tool bay. Such a material transport system is disclosed in U.S. Application Ser. No. 60/698,124 entitled "Belt Conveyor," which is assigned to Asyst Technologies, Inc., and is incorporated in its entirety herein by reference. It is also within the scope of the invention for the system 100 to operate in conjunction with other types of material transport systems known within the semiconductor industry such as, but not limited to, a rail guided vehicle, an automated guided vehicle, and an overhead hoist transport shuttle. FIG. 1 illustrates a section of the material transport system 50 that passes underneath the storage shelf 120 of the load port 102 and the storage shelf 152 of the load port 104. Each bottommost storage shelf is elevated from the facility floor such that a container 10 traveling on the material transport system 50 travels unobstructed underneath the storage shelves 120 and 152.

The configuration of the system 100 may differ from the FIG. 1 embodiment. For example, if the processing tool only has room for a "two-wide" system (e.g., two load ports), the second load port 104 may be eliminated from the system 100. The load port 102 and the transfer module 106 may operate as a system. Alternatively, the second load port 104 in a three-wide system 100 may include all storage locations. If the load port 104 includes all storage locations, the system 100 shown in FIG. 1 would include two wafer access locations (e.g., shelves 112 and 114) and seven storage locations (e.g., shelves 116, 118, 120 in load port 102 and five storage shelves in load port 104).

Figure 2:
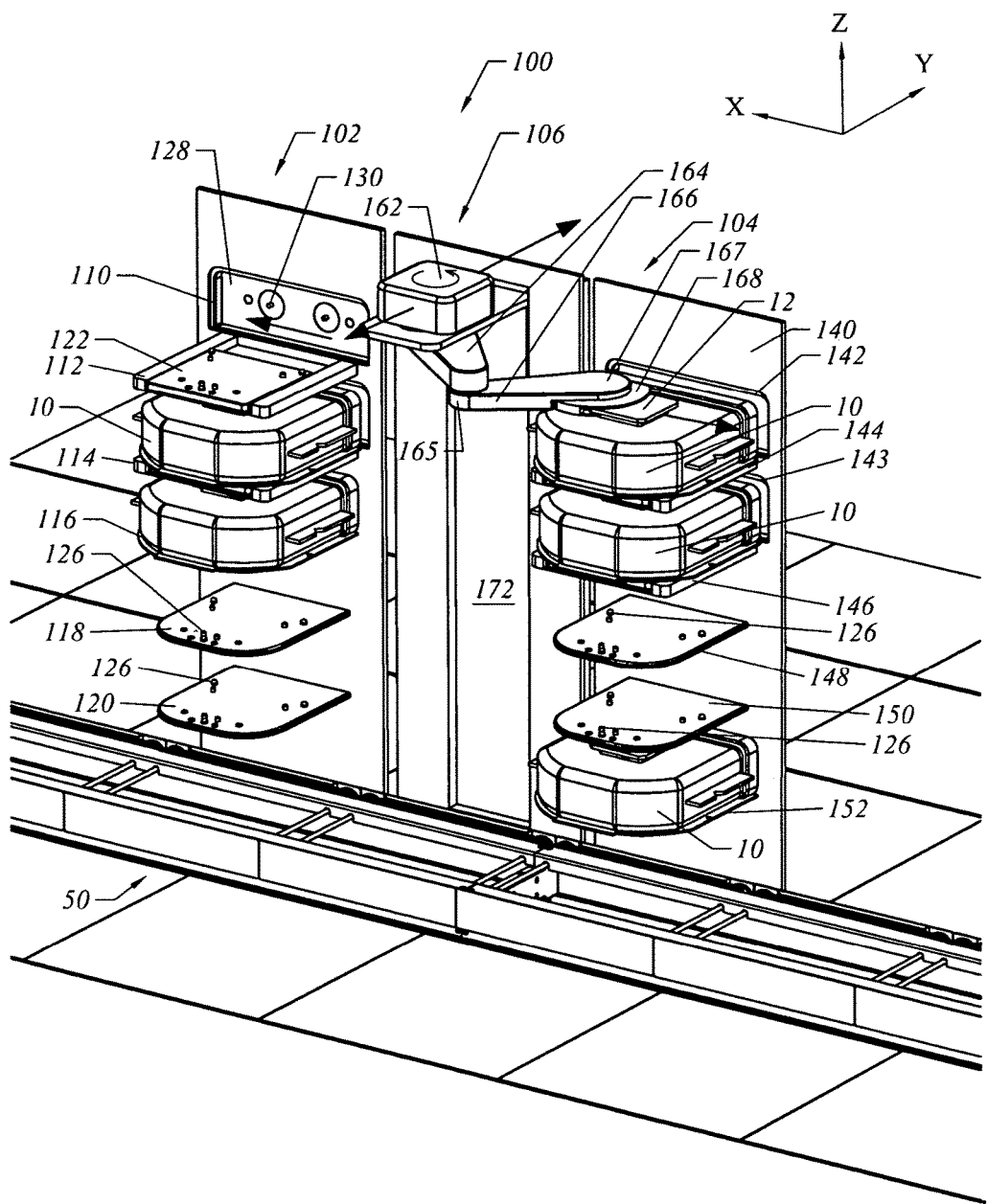
FIG. 2 is a perspective view of the embodiment shown in FIG. 1, illustrating the a container transfer device in operation.

FIG. 2 illustrates that the shoulder 162 is actuated to move along a Y axis (towards/away from the plate 159) relative to carriage 170, and may also rotate (as shown by the rotational arrow). The shoulder motion enables the mechanism 160 to align containers 10 with the material transport system 50, each of the storage locations and each of the wafer access locations. The mechanism 160 may accordingly pick up or place a container 10 anywhere on the material transport system 50 within the lateral range of the link arm.

The gripper 168 may be a passive or active device. For example, the gripper 168 shown in FIGS. 1-2 comprises a structure that includes a slot 169 passing entirely through the gripper. In this embodiment, the mechanism 160 picks up a container 10 by aligning the slot 169 with the top handle 12 of a container 10, and as shown in FIG. 2, moving the gripper 168 over the top handle 12 until the top handle 12 is located substantially within the slot 169. The slot 169 in the gripper 168 allows the gripper 168 to move unobstructed over the t-shaped top handle 12 of the container 10. The gripper 168 preferably engages the container's top handle 12 even if the gripper 168 comprises a passive device in order to prevent the container 10 from sliding off the gripper 168.

In one embodiment, the underside of the handle 12 includes registration features such as kinematic pins. With such a handle 12, the gripper 168 slides over the top handle 12 such that the handle 12 slides within the slot 169 and the kinematic pins are aligned with corresponding registration features in the gripper 168. At that point, the mechanism 160 lifts the gripper 168 so that the kinematic pins engage the registration features in the gripper slot 169 and lifts the container 10 off the conveyor 50, storage location or container advance shelf. One example of a gripper is disclosed in U.S. Pat. No. 6,579,052, titled "SMIF Pod Storage, Delivery and Retrieval System," which is assigned to Asyst Technologies, Inc., and is incorporated in its entirety herein by reference.

The gripper 168 may include active mechanisms to secure the handle 12 to the gripper 168. For example, once the container 10 is lifted slightly, the gripper 168 may activate a clamp to prevent the container 10 from moving relative to the gripper 168 or slipping out of the gripper slot 169. It is within the scope of the invention for the gripper 168 to include other features, such as optical or tactile sensors to detect the presence and proper gripping pressure of the container handle 12.

The lower link arm 166 and the gripper 168 are preferably thin enough so that the mechanism 160 can place (and remove) a container 10 on any of the storage locations on the load ports 102 and 104 without contacting the shelf above. Thus, the mechanism 160 must be able to maneuver the gripper 168, the lower link arm 166 and the container 10 between two adjacent shelves.

For example, the mechanism 160 placing a container 10 on the storage shelf 120 will take the following steps. The carriage 170 is lowered until the container 10 is at an elevation whereby the bottom of the container 10 is slightly above the elevation of the kinematic pins 126 extending upward from the shelf 120. The mechanism 160 extends the link arms 164 and 166 to move the container 10 horizontally until the registration features in the bottom of the container 10 align with the kinematic pins 126. When the container 10 is aligned with the kinematic pins 126, the carriage 170 is again lowered until the container 10 is seated on the shelf 120. Once the container 10 is seated on the shelf 120, the mechanism 160 moves the gripper 168 away from the handle 12 and retracts the link arms 164 and 166 back to the position shown in FIG. 1. The mechanism 160 is then free to move to another elevation or to a rest position.

FIGS. 3A-3D illustrate one embodiment of a load port in operation with a container having a mechanically openable front door 14. The operation of the container advance plate 112 of the load port 102 is shown for exemplary purposes only. FIGS. 3A-3D may apply to any of the container advance plates on either load port 102 or load port 104. In FIG. 3A, the container 10A is shown placed on the container advance plate 122 of the storage location 112. The container advance plate 122 is shown in a retracted position, which may align vertically with the transport system (e.g., material transport system 50, shuttle, etc) so that the mechanism 160 does not have to move the container 10 along the y-axis in order to place the container 10 on the container advance plate 122. If the storage locations align with the transport system, the mechanism 160 would not require a shoulder 162 that could move along the y-axis.

FIG. 3B illustrates the container advance plate 122 in an advanced, fully forward position. The container advance plate 122 may be actuated by a motor such as, but not limited to, a motor located in the load port 102 or it may be actuated by the same drive mechanism that moves the shoulder 162 along the y-axis. The container advance plate 122 may also comprise a fee-sliding plate (e.g., not driven by a motor) that is moved by the container transport mechanism 160. For example, the mechanism 160 may set a container on the advance plate 122 and, while still engaged with the container 10, move the container towards the plate 108. Regardless, in this forward position, the front opening 13 of the container is inserted into the opening 110 of the plate 108 until the latch keys 130 extending from the load port door 128 are inserted into the container door receptacles (not shown). In this position, the face of the port door 128 may contact the container door 14 or form a proximate seal with the port door 128. The latch keys 130 unlock the container door 14 from the container shell, and in one embodiment, also retain the container door 14 against the face of the port door 128.

In FIG. 3C, the container advance plate 122 has retracted slightly until the front opening 13 of the container 10 protrudes slightly into the plate 108 of the load port 102. The container 10 has been retracted far enough to allow the load port door 128 to open. In this embodiment, the container door 14 is held or stored within the load port door 128.

In FIG. 3D, the load port door 128 is shown in an open position. In this embodiment, the port door 128 has been moved vertically upward behind the plate 108 while remaining oriented relative to the plane of the plate 108. The storage location 114 operates in a similar manner to the steps performed by storage location 112 and the port door 128 shown in FIGS. 3A-3D. The port door 129 is, however, lowered vertically downward to an open position.

The pod doors 128 and 129 may operate by other methods or steps, including, but not limited to, methods and steps similar to current 300 mm FOUP load ports. One difference between the load port 102 and a conventional load port is that the port door 128 is preferably not lowered to an open position because lowering the port door 128 would obstruct the lower opening. The port door 128 could be lowered, but the storage locations 112 and 114 would have to be separated further apart to accommodate the port door 128 travel. While spacing the storage locations 112 and 114 is possible, doing so would decrease the efficiency of the load port's storage capacity. FIGS. 3A-3D illustrate a load port 102 whereby the container 10 is moved back and forth in order to removes the container door 14. It is also within the scope of the invention for the port door 128 to move towards and away from the container door 14 in order to remove the container door 14.

The load port 102 may also operate with a container that does not include a mechanically openable door 14. In that case, the port doors 128 and 129 may instead comprise a shutter that moves between an open and closed position. The open position allows a wafer handling robot to access wafers through the opening. The shutter may remain in a closed position while the load port is not in operation to prevent particles from entering the processing tool or EFEM. Alternately, the load port 102 may not include a port door or shutter at all.

Figure 4A:
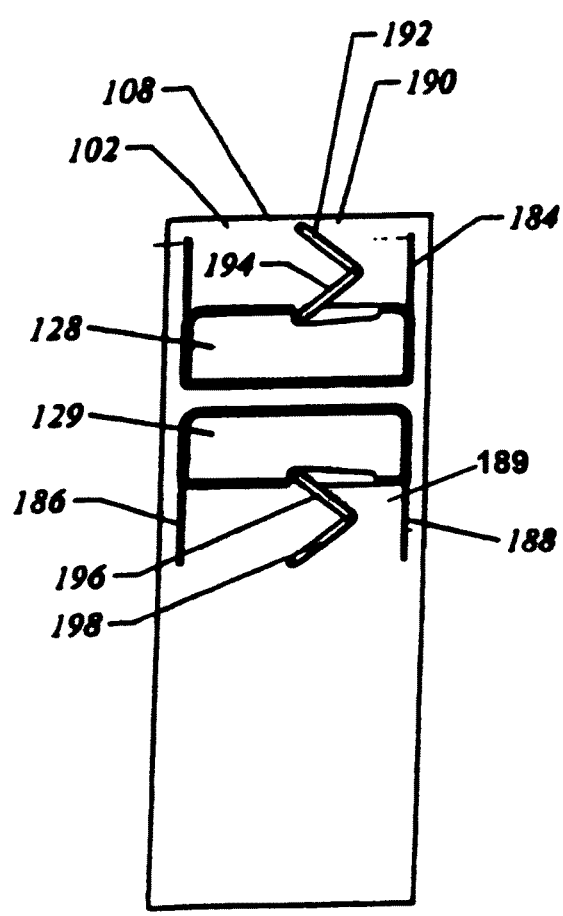
FIGS. 4A-4B are schematic rear views of the embodiment shown in FIG. 1, illustrating one embodiment of a door mechanism.
Figure 4B:
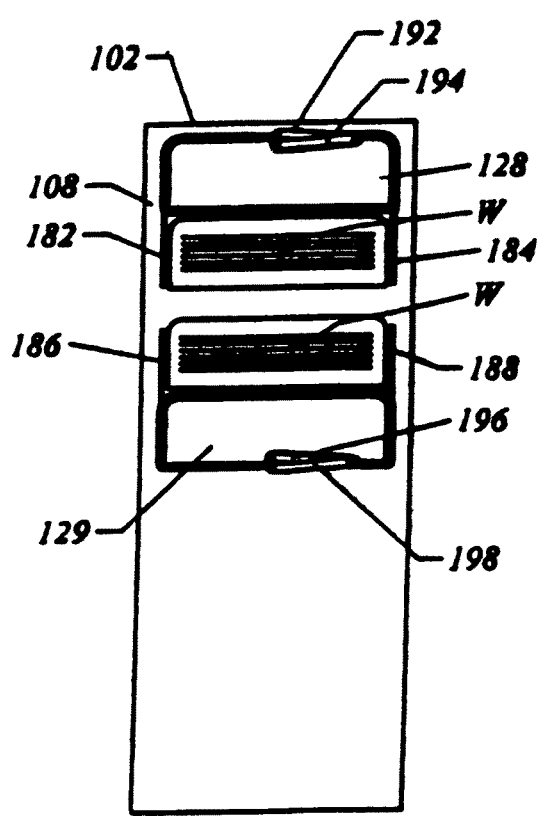

FIGS. 4A-4B illustrate one embodiment of a mechanism 189 for moving a port door between an open and closed position. FIG. 4A illustrates the port doors 128 and 129 in a closed position. In this embodiment, the mechanism 189 includes a linkage having a first link 196 and a second link 198 for moving the port door 129 between an open and closed position. The first link 196 is secured to the port door 129 and the second link 198 is secured to the plate 108. The mechanism 190 includes a linkage having a first link 192 and a second link 194 for moving the port door 128 between an open and closed position. The first link 192 is secured to the port door 128 and the second link 194 is secured to the plate 108. The linkages 189 and 190 may be driven by a gear motor in either the port door or mounted to the plate 108.

Each port door travels along a pair of rails. In this embodiment, the plate 108 includes rails 182 and 184 that the port door 128 travels along between the open and closed positions. The plate 108 also includes a pair of second rails 186 and 188 that the port door 129 travels along between the open and closed positions. It is within the scope of the present invention to move the port doors 128 and 129 by other mechanical devices, and use other mechanisms for maintaining the port door's travel between the open and closed positions.

FIG. 4B illustrates the port doors 128 and 129 in an open position. In FIG. 4B, the mechanism 189 has retracted the linkages 196 and 198 to lower the port door 129 along the rails 186 and 188 to its open position. The mechanism 190 has retracted the linkages 192 and 194 to raise the port door 128 along the rails 182 and 184 to its open position. As discussed above, the port door 128 is raised to its open position to avoid blocking the opening 111. The port door 129 is lowered to prevent the port door 129 from blocking the opening 110.

FIGS. 8-11 illustrate other embodiments of mechanisms for opening and closing a port door. FIGS. 8A-8B illustrate an opening mechanism whereby the doors are each supported by a single linear slide and drive mechanism. In this embodiment, the port doors 128 and 129 each slide along a vertical linear slide 175. The port door 128 slides upward to an open position (see FIG. 8B) allowing a wafer handling robot to access wafers through the opening 110. The port door 129 slides downward to an open position (see FIG. 8B) allowing a wafer handling robot to access wafers through the opening 111. Each port door slides in such a way that it does not block the other opening (e.g., port door 128, when located in the open position, does not block opening 111 and port door 129, when located in an open position, does not block opening 110).

FIGS. 9A-9B illustrate a horizontal linear slide mechanism for moving the port doors between an open position (see FIG. 9B) and a closed position (see FIG. 9A). In this embodiment, the port door 128 travels along a linear rail or slide 180 while the port door 129 travels along the linear rail or slide 182. A load port having the FIG. 9 port door configuration may have more active storage shelves (e.g., storage shelves 112 and 114) than a load port having the FIG. 8 port door configuration. The load port with horizontal motion port doors does not have to accommodate any vertical door motion, which requires spacing the active storage shelves further apart as discussed above.

FIGS. 10A-10B illustrate a port door drive mechanism that rotates the port doors between an open position (see FIG. 10B) and a closed position (see FIG. 10A). In this embodiment, the port door drive mechanism rotates the port door 128 about a joint R1 while the port door drive mechanism rotates the port door about a joint R2. The port door 128 of the load port 102, in this embodiment, is rotated counterclockwise to the open position while the port door 129 of the load port 102 is rotated clockwise to its open position. The port door 128 of the load port 104, in this embodiment, is rotated clockwise to its open position while the port door 129 of the load port 104 is rotated counterclockwise to its open position. The port doors 128 and 129 of each particular load port are rotated in opposite directions to avoid blocking the load port opening of the other port door.

Figure 5:
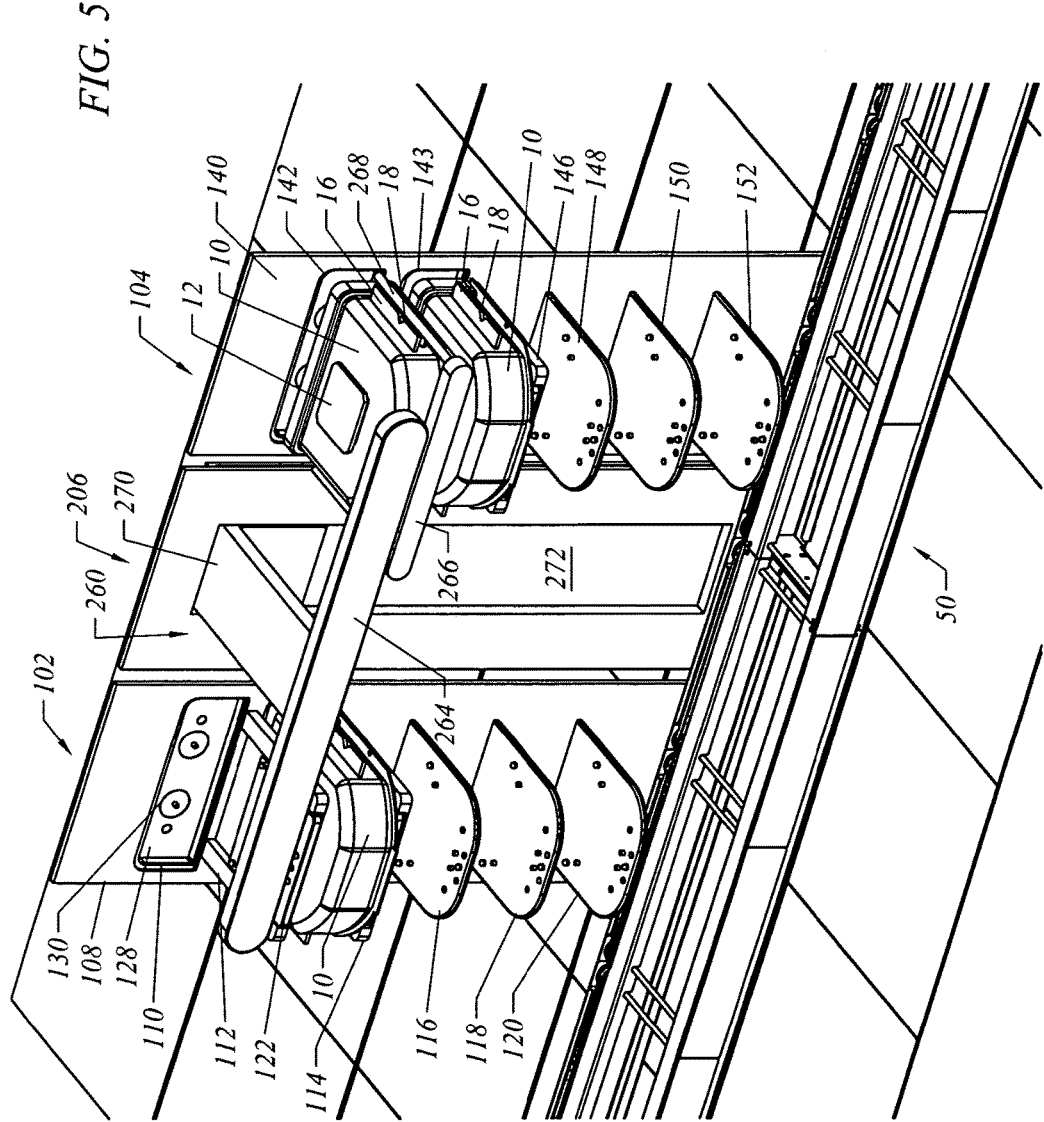
FIG. 5 is a perspective view of another embodiment of the present invention.
Figure 6:
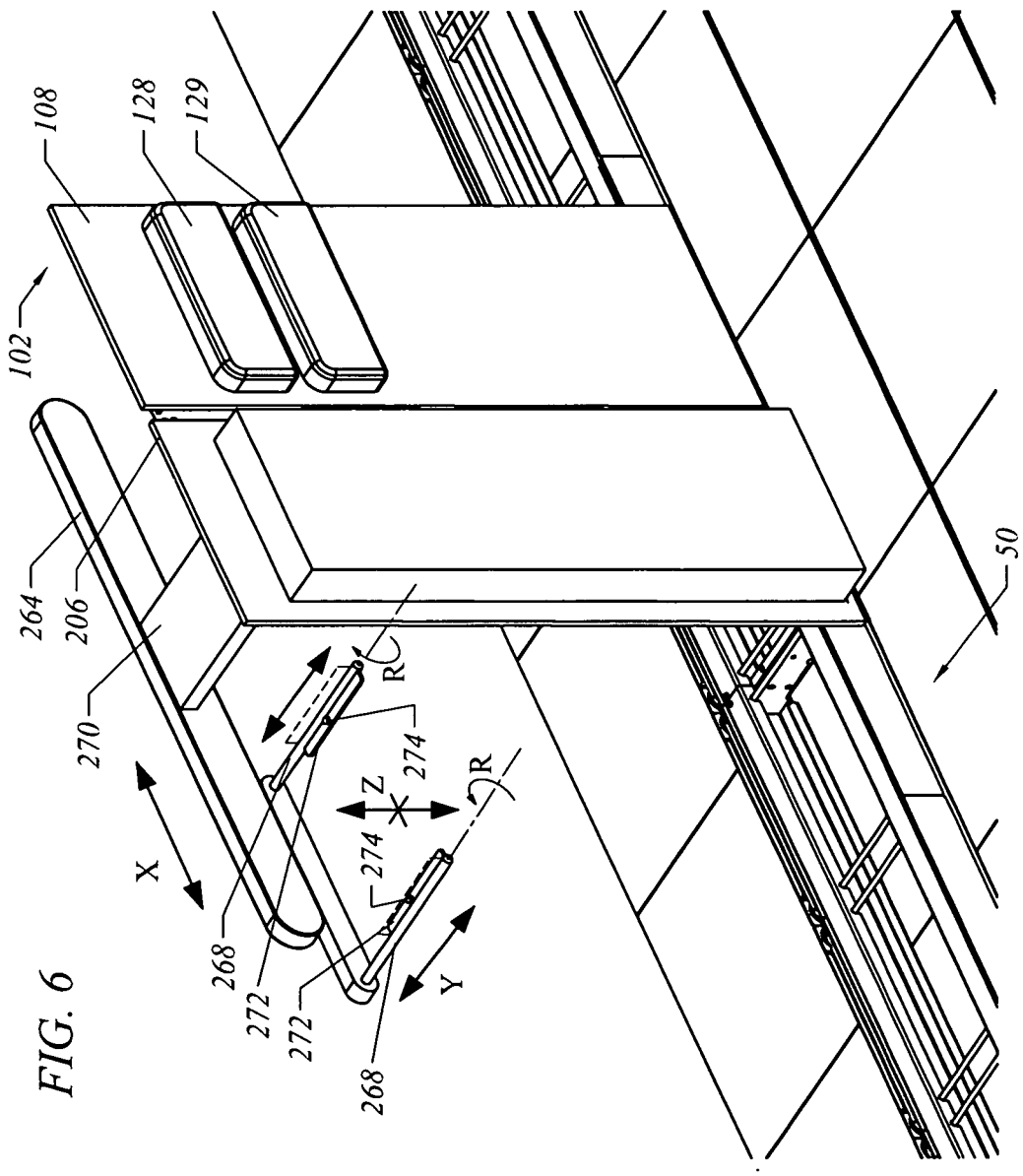
FIG. 6 is a rear perspective view of the present invention shown in FIG. 5.

FIGS. 5-6 illustrate another embodiment of a container transfer mechanism in operation with the load ports 102 and 104. In this embodiment, the mechanism 260 comprises a fork-lift type mechanism. The mechanism 260 includes, among other things, a carriage 270, a slide arm 264 and a gripper 266. In this embodiment, the carriage 270 travels vertically along the front of the load port 206 within a track 272. The gripper 266 travels horizontally between the first end 263 and second end 265 of the slide arm 264. In this embodiment, the gripper 266 includes a base 269 with a pair of support bars 268 extending from the base 269. Each support bar 268 includes a platform 272 with a registration feature 274. In one embodiment, each support bar 268 may rotate with respect to the base 269.

FIG. 5 illustrates that the load port 102 includes active storage locations 112 and 114 and passive storage locations 116, 118 and 120. The load port 104 includes active storage locations 144 and 146 and passive storage locations 148, 150 and 152. The combination of the vertical motion of the carriage 270 and the horizontal motion of the gripper 266 allows the mechanism 260 to access a container 10 seated in any of active or passive storage locations of either load port 102 or 104 or a container seated on the material transport system 50.

FIG. 5 illustrates the mechanism 260 engaging the container 10 seated in the active storage location 144. The container 10 seated in storage location 144 includes, among other things, a top handle 12 and a pair of side handles 16. Each container side handle 16 includes a registration feature or notch 18. To access the container 16, the mechanism 260, with the gripper 266 located in the z-travel zone, first raises the carriage 270 and slide arm 264 to an appropriate elevation. The "appropriate" elevation is an elevation whereby the gripper 264 may travel horizontally along the slide arm 264 until the gripper 266 is centered over the top of the container 10. The mechanism 260 then lowers the carriage 270 until the gripper arms 268 pass by the container side handles 16. Then, the gripper arms 268 rotate towards the container 10 until the registration feature 274 on each gripper arm 268 registers with the notch 18 in the container's side handle 16. At this point, the container 10 is engaged with the gripper 266 and may be lifted from the container advance plate of the storage location 144.

For illustration purposes, FIG. 6 provides a rear isometric view of the mechanism 260 with the load port 104 removed. In one embodiment, the gripper arms 268 may be actuated to move in the Y axis (shown by arrow Y) and rotate (shown by arrow R) between a lift position (shown in FIG. 6) and a clearance position (shown in hidden lines). The arms 268 of the gripper 266 are preferably spaced apart further than the width of a container 10. This way, when the arms 268 are located in the clearance position, the mechanism 260 is able to move the carriage 270, and therefore the gripper 266, in the Z direction (shown by arrow Z) without having to first retract the gripper 266 in the X direction (shown by arrow X) to the container Z travel zone. In other words, the mechanism 260 could move the gripper 268 vertically directly between storage locations. Being able to move the gripper 266 directly between storage locations improves the throughput of the system 100 by eliminating the additional motion back and forth to the container Z travel zone if the gripper arms 268 could not travel over each container 10.

In operation, the mechanism 260 first moves downward until the gripper arms 268 engage a container 10 seated on the material transport system 50. The mechanism then lifts the container 10 from the material transport system 50, moves the container 10 within the container Z travel zone to the appropriate elevation, moves the gripper 266 along the slide arm 264 and places the container 10 on a passive storage location (e.g., storage shelf 148). After placing the container 10 on the storage shelf 148, the mechanism 260 then moves the gripper 268 vertically to the storage shelf located directly above (e.g., storage shelf 146) to engage the container 10 seated on that shelf. The mechanism 260 does not have to move the gripper 268 first to the container Z travel zone, raise the gripper 268 and then move the gripper 268 over the container 10 seated on the storage shelf 146. The gripper 268 can then engage the container seated on the storage shelf 146 and, for example, move the container 10 over to the container Z travel zone and down to the material transport system 50.

In another embodiment, the gripper arms 268, instead of rotating, move along the X direction to separate the arms 268 apart enough to clear the container side handles 16 as the gripper 266 vertically passes the container 10. One advantage of the mechanism 260 having fork lift type arms 268 is that both the top and bottom handling features of the container 10 (e.g., top handle 12 and bottom plate) are not obstructed while the gripper 266 is transporting the container 10. The mechanism 260 is therefore well suited for handoffs to container transport systems that require access to either the top handle 12 or the bottom plate of the container 10 (e.g., overhead transport shuttle or floor based material transport system 50).

Figure 7:
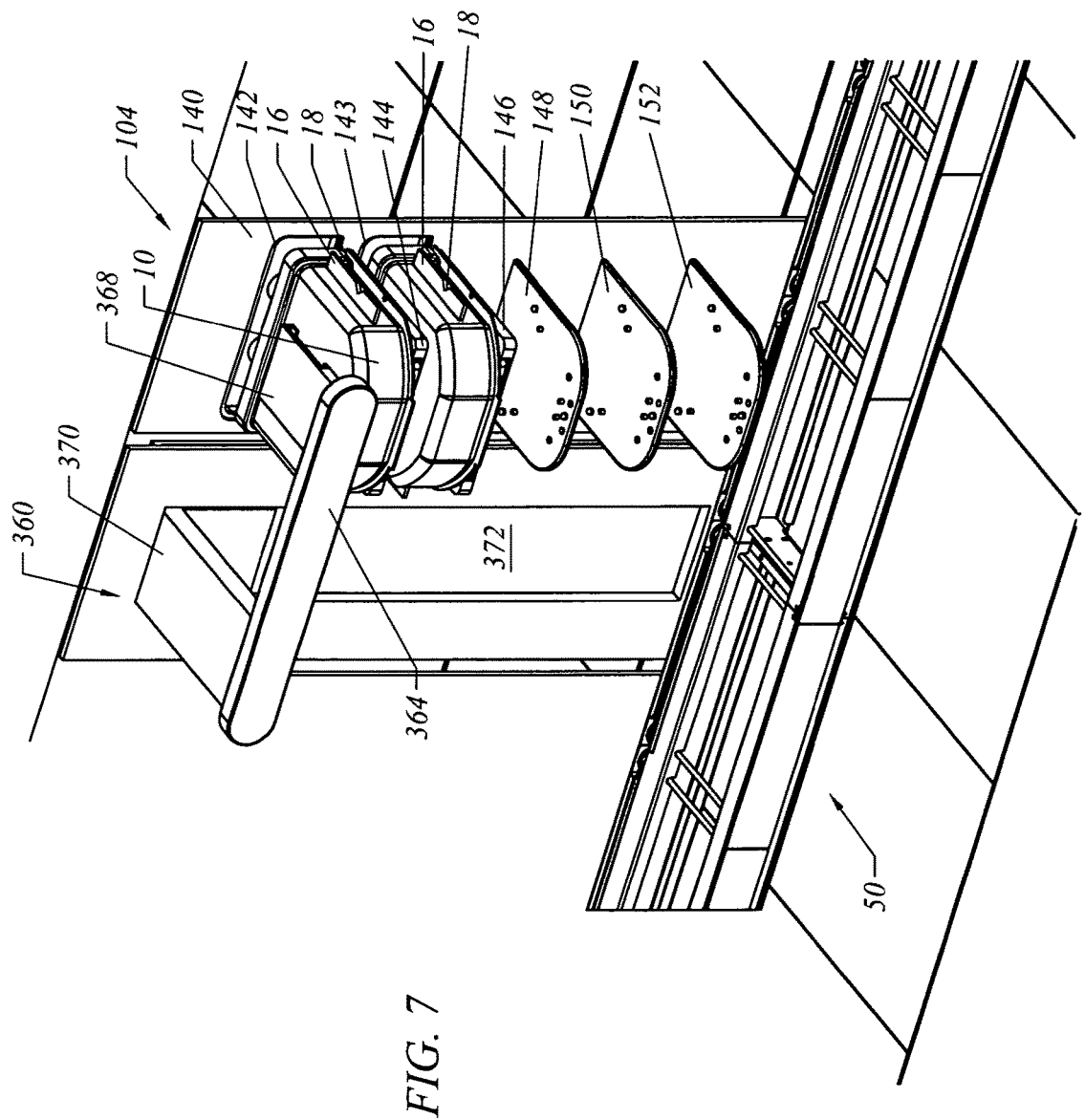
FIG. 7 is a perspective view of yet another embodiment of the present invention.

FIG. 7 illustrates a container transfer mechanism 360. The container transfer mechanism 360, which is dedicated to the load port 104, includes, among other things, a carriage 370, a slide arm 364, and a gripper 368. This gripper 368 slides between the first end 365 and second end 366 of the slide arm 364. In this embodiment, the gripper 368 engages the top handle 12 of a container 10.

FIG. 7 illustrates that the load port 104 includes active storage locations 144 and 146 and passive storage locations 148, 150 and 152. The combination of the vertical motion of the carriage 370 and the horizontal motion of the gripper 368 allows the mechanism 360 to access a container 10 seated in any of active or passive storage locations of the load port 104 or a container seated on the material transport system 50.

FIG. 7 illustrates the mechanism 360 engaging the container 10 seated in the active storage location 144. The container 10 seated in storage location 144 includes, among other things, a top handle 12 and a pair of side handles 16. To access the container 10, the mechanism 360, with the gripper 368 located in the z-travel zone, first raises the carriage 370 and slide arm 364 to an appropriate elevation. The "appropriate" elevation is an elevation whereby the gripper 368 may travel horizontally along the slide arm 364 until the gripper 368 slides over the handle 12 and is centered over the top of the container 10. At this point, the container 10 is engaged with the gripper 368 and may be lifted from the container advance plate of the storage location 144. After the container 10 is lifted from the storage location 144, the gripper 368 moves back to the first end 265 of the arm 364 such that the container 10 is located within the z-travel zone. The mechanism 360 may then lower the container 10 onto the material transport system 50.

Figure 11:
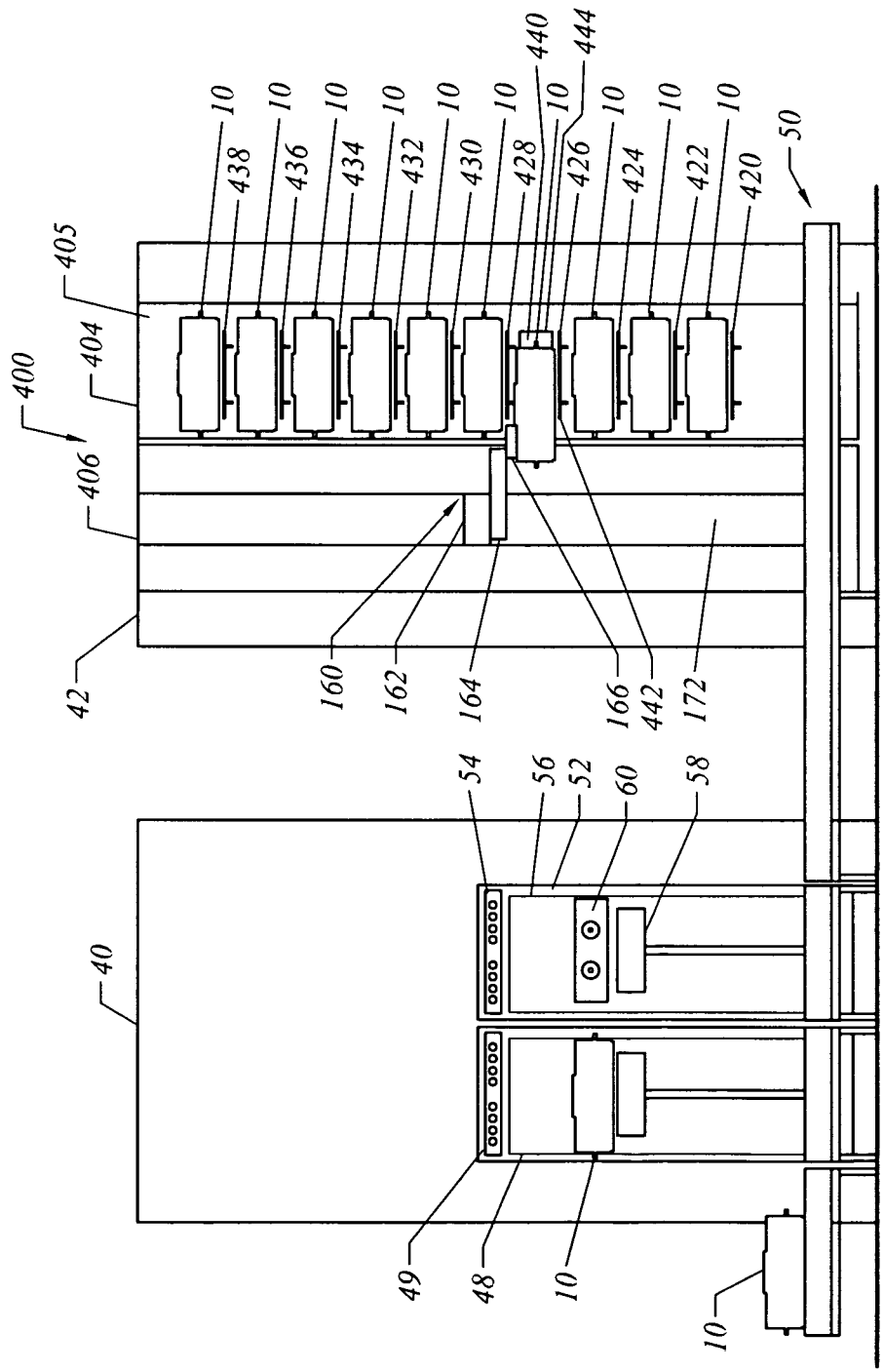
FIG. 11 is a front view of another embodiment of the present invention.

FIG. 11 illustrates how the present invention provides additional storage locations in the typically unused chimney space above a load port. FIG. 11 illustrates two process tools 40 and 42. Process tool 40 includes two conventional load ports 48 and 52. Each load port has been modified to operate with a small capacity container 10. For example, load port 52 includes, among other things, a plate 54 having an opening 56, a vertically adjustable container advance mechanism 58 and a port door 60. Such a load port is disclosed in U.S. application Ser. No. 11/177,645, entitled "Direct Tool Loading," which is assigned to Asyst Technologies, Inc., and is incorporated by reference in its entirety herein.

The opening 56 in the plate 54 is large enough to accommodate a conventional 300 mm FOUP. In FIG. 11, the opening 56 has been effectively reduced to correspond with the container door 14 of a small capacity container 10. Such a load port for operating with both conventional 300 mm FOUPs and small capacity containers is disclosed in U.S. Application No. 60/819,602, entitled "Variable Lot Size Load Port," which is assigned to Asyst Technologies, Inc., and is incorporated in its entirety herein. The load port 54 cannot store or buffer any containers 10 below the opening 56 or above the opening 56. The space located below the opening 56 must be free so that the mechanism 58 may travel between the position shown in FIG. 11 and the material transport system 50. And the load port 54 does not have any ability to store containers above the opening 56.

FIG. 11 illustrates a first processing tool 40 adjacent a second processing tool 42. The processing tools 40 and 42 receive containers 10 from the material transport system 50. A system 400 adjacent is mounted to the front end of the processing tool 42 while the load ports 48 and 54 are mounted to the processing tool 40. In general, the processing tools 40 and 42 have the same dimensions (e.g., height and width) for the purpose of describing the advantages of the system 400 over the load ports 48 and 54.

The system 400 includes a load port 404 and a transfer module 406 both mounted to the front of the processing tool 42. In this embodiment, the load port 404 and the transfer module 406 extend the entire face of the processing tool 42 from the bottom of the tool to the top of the tool. The load port 404 and/or the transfer module 406 may comprise different lengths and are not required to extend the entire face fo the tool 42. A container transport mechanism 160 transports containers 10 between the storage shelves 420-438 and the material transport system 50. As discussed above regarding FIG. 1, the mechanism 160 includes, among other things, a shoulder drive box 162 attached to a carriage 170, an upper link arm 164, a lower link arm 166 and a gripper 168.

The load port 404 may include any number of wafer access locations and/or storage locations. In this embodiment, the load port 404 includes a plate 405 having a first opening 440 and a second opening (not visible), two wafer access locations 424 and 426, and eight storage locations 420, 422, 428, 430, 432, 434, 436 and 438. The wafer access location 426 includes a container advance plate 442 and a port door 444. The container advance plate 442 supports a container 10 such that a workpiece stored within the container 10 may be accessed from within the tool 42 through the first opening 440. The port door 444 moves between an open and closed position, and in this embodiment, unlocks and removes the container door from the container shell. The wafer access location 424, which is located beneath the wafer access location 426, also contains a container advance plate 425 and port door (not shown).

The load port 404 may include any number of storage locations. In this embodiment, the load port includes eight storage locations. In this embodiment, each of the eight storage locations 420, 422, 428, 430, 432, 434, 436 and 438 comprises a storage shelf having a registration feature. The load port 404 controls the transfer of workpieces into and out of the processing tool 42 through the two openings located in the plate 405. Thus, the storage locations 420, 422, 428, 430, 432, 434, 436 and 438 do not require a container advance plate or an opening in the plate 405. The workpieces stored in a container 10 seated in a storage location cannot be accessed. The workpieces cannot be accessed until the container transport mechanism 160 (described later) removes the container 10 from the storage location and transfers the container 10 to either wafer access location 424 or 426.

The transfer module 406 is mounted to the front end of the processing tool 42 adjacent the load port 404. The transfer module 406 generally includes a plate 107 having a track 172 and a transport mechanism 160. In this embodiment, the transport mechanism 160 is similar to the transport mechanism shown in FIG. 1. The mechanism 160 includes, among other things, a shoulder drive box 162, an upper link arm 164, a lower link arm 166, a gripper 168 and a carriage 170. The carriage 170 travels vertically along the track 172 (referred to as the "container Z travel zone"). The carriage 170 may be driven along the track 172 by a ball screw, belt, cable hoist, rack and pinion or any other linear drive method known within the art.

The mechanism 160 travels along the track 172 to access any of the storage locations or wafer access locations on the load port 404, and also move containers between the load port 404 and the material transport system 50. The load port 404 utilizes a majority of the front face of the processing tool 42 for storing containers 10 while still leaving two input/output ports for transferring workpieces into and out of the processing tool 42.

The load ports 48 and 52 each provide one wafer access location. The load port 52 includes a plate 54, mounted to the front end of the processing tool 40, having a single opening 56. The load port 48 includes a plate 49, mounted to the front end of the processing tool 40, having a single opening (not visible). The plate 49 of the load port 48 and the plate 56 each include a single opening. Thus, the load port 404 includes the same number of input/output ports as the two load ports 48 and 52 have combined. The wafer processing throughput of the load port 404 is therefore substantially the same as the two load ports 48 and 52. However, the load ports 48 and 54 do not include any storage locations while the load port 404 includes eight storage locations 420, 422, 428, 430, 432, 434, 436 and 438. The system 400 is not required to include any input/output ports. In this case, the load port 404 may, for example, comprise all storage locations in order to provide additional storage for the processing tool 40.

Figure 12:
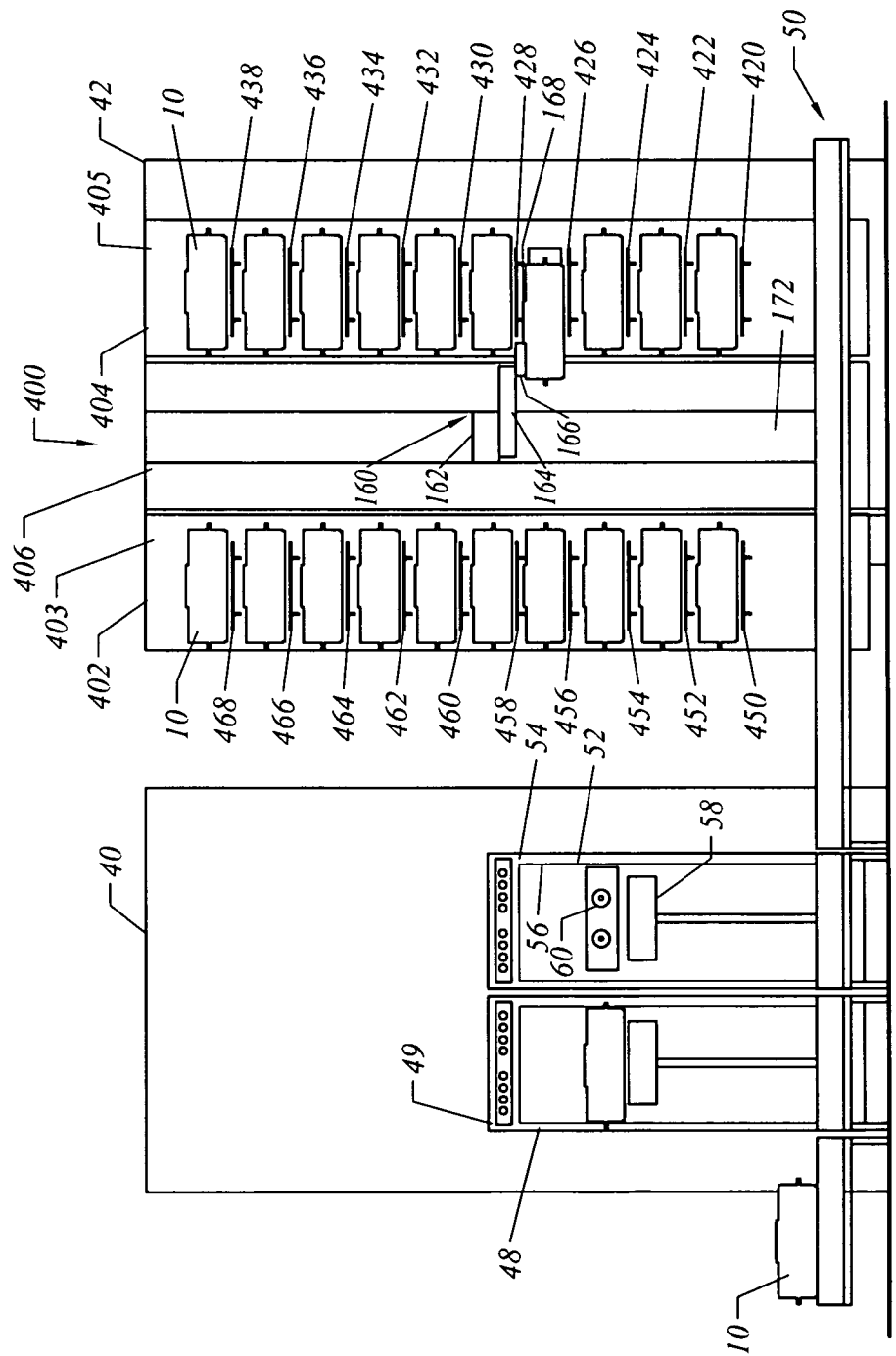
FIG. 12 is a front view of the system shown in FIG. 11, including an additional column of storage locations.

FIG. 12 illustrates the system 400 including an additional storage port 402. The storage port 402 includes a plate 403 mounted to the front of the processing tool 42. In this embodiment, the storage port 402 includes ten storage locations 450, 452, 454, 456, 458, 460, 462, 464, 466 and 468. Any number of storage locations are within the scope of the invention. FIG. 12 illustrates the plate 403 extending out beyond the edge 43 of the processing tool 42. The plate may extend beyond the edge 43 of the processing tool 42 because the storage column 402 includes only storage locations.

The storage port 402 may, however, include one or more wafer access locations. If the storage port 402 includes at least one wafer access location, the plate 403 would likely not extend beyond the edge 43 of the processing tool 42 so that the opening in the plate 403 would provide access to the interior of the processing tool 42. In the FIG. 12 embodiment, the system 400 provides two wafer access locations 424 and 426 and eighteen storage locations 420, 422, 428, 430, 432, 434, 436 and 438 and 450, 452, 454, 456, 458, 460, 462, 464, 466 and 468 all on the front of the processing tool 42. The transfer module 406 includes a container transport mechanism 160 for transporting a container 10 between any of the storage locations, the wafer access locations and the material transport system 50. In comparison, the load ports 48 and 54 provide two wafer access locations and no storage locations on the face of the processing tool 40.

The load port 402 may provide additional storage for the processing tool 40, as well as provide storage for the processing tool 42. In addition, the load port 404 may be replaced with a storage port. In this case, the system 400 does not present containers to the tool 42, and instead provides additional storage locations for the processing tool 40.

It should be appreciated that the above-described load ports and associated mechanisms for accommodating and operating with containers are for explanatory purposes only and that the invention is not limited thereby. Having thus described a preferred embodiment of a method of operation and load port system, it should be apparent to those skilled in the art that certain advantages of the within system have been achieved. It should also be appreciated that various modifications, adaptations, and alternative embodiments thereof may be made within the scope and spirit of the present invention. For example, the load ports and containers have been illustrated and described in context of a semiconductor fabrication facility, but it should be apparent that many of the inventive concepts described above would be equally applicable to be used in connection with other non-semiconductor manufacturing applications.

We claim:

1. A system for storing and accessing semiconductor wafers for interfacing with a processing tool, comprising:
a load port defined by a first plate having an access port defined therein, the first plate of the load port being securable to the processing tool;
a first container support location defined at the access port, said access port enabling transfers of semiconductor wafers between the first container support location and the processing tool;
a second container support location defined above and vertically aligned with the first container support location;
a third container support location defined below and vertically aligned with the first container support location; and
a transfer module defined by a second plate distinct from the first plate and a container transport mechanism operably coupled to the second plate, the second plate including a track, the container transport mechanism configured to move vertically along the track, the second plate of the transfer module being securable to the processing tool at a location that is adjacent to the first plate on either a left adjacent side or a right adjacent side of the first plate, and wherein the transfer module is configured for moving containers among the first, second and third container support locations;
wherein the load port and the transfer module are each independently detachable from the processing tool;
wherein the first plate defines a width to accommodate only a single column of vertically aligned container support locations; and
wherein the second plate defines a width substantially similar to the width defined by the first plate;
wherein said first plate and said second plate conform to a Box Opener/Loader to Tool Standard Interface.

2. The system as recited in claim 1, wherein said first access location includes:
a container advance plate for supporting a container and moving the container between a first position and a second position; and
a port door for controlling access through said access port in said first plate.

3. The system as recited in claim 1, wherein said container transport mechanism is configured to engage each container at a top handle.

4. The system as recited in claim 1, wherein the track is along a Z travel zone.

5. The system as recited in claim 1, wherein said transfer module includes:
the second plate; and
the container transport mechanism, including:
a carriage able to move vertically along the track;
an upper link arm having a first end and a second end, said first end rotatably coupled with said carriage;
a lower link arm having a first end and a second end, said first end rotatably coupled with said second end of said upper link arm; and
a gripper rotatably coupled with said second end of said lower link arm.

6. The system as recited in claim 1, wherein the container is configured for storing semiconductor wafers.

7. The system as recited in claim 1, wherein the container includes a container shell having a mechanically openable door.

8. A system, comprising:
a processing tool;
a load port defined by a first plate having an access port defined therein, the first plate of the load port being securable to a front side of the processing tool;
a first container support location defined at the access port, said access port enabling transfers of semiconductor wafers between the first container support location and the processing tool;
a second container support location defined above or below and vertically aligned with the first container support location;
a third container support location defined above or below and vertically aligned with the first container support location or the second container support location; and
a transfer module defined by a second plate distinct from the first plate and a container transport mechanism operably coupled to the second plate, the second plate including a track, the container transport mechanism configured to move vertically along the track, the second plate of the transfer module being securable to the processing tool at a location that is adjacent to the first plate on either a left adjacent side or a right adjacent side of the second plate, and wherein the transfer module is configured for moving containers among the first, second and third container support locations;
wherein the load port and the transfer module are each independently detachable from the processing tool;
wherein the first plate defines a width to accommodate only a single column of vertically aligned container support locations; and
wherein the second plate defines a width substantially similar to the width defined by the first plate;
wherein said first plate and said second plate conform to a Box Opener/Loader to Tool Standard Interface.

9. The system of claim 8, further comprising:
a second access port defined in the first plate, wherein either the second or third container support locations are defined at the second access port.

10. The system as recited in claim 8, wherein said transfer module includes:
the second plate; and
the container transport mechanism, including:
a carriage able to move vertically along the track;
an upper link arm having a first end and a second end, said first end rotatably coupled with said carriage;
a lower link arm having a first end and a second end, said first end rotatably coupled with said second end of said upper link arm; and
a gripper rotatably coupled with said second end of said lower link arm.

11. The system as recited in claim 8, wherein the container is configured for storing semiconductor wafers.

12. The system as recited in claim 8, wherein said first access location includes:
a container advance plate for supporting a container and moving the container between a first position and a second position; and
a port door for controlling access through said access port in said first plate.

13. The system as recited in claim 8, wherein said transfer module includes a container transport mechanism that is configured to engage each container at a top handle.

14. A system, comprising:
a processing tool;

a load port defined by a first plate having an access port defined therein, the first plate of the load port being securable to a front side of the processing tool;

a first container support location defined at the access port, said access port enabling transfers of semiconductor wafers between the first container support location and the processing tool;

a second container support location defined above or below and vertically aligned with the first container support location;

a transfer module defined by a second plate distinct from the first plate and a container transport mechanism operably coupled to the second plate, the second plate including a track, the container transport mechanism configured to move vertically along the track, the second plate of the transfer module being securable to the processing tool at a location that is adjacent to the first plate on either a left adjacent side or a right adjacent side of the second plate, and wherein the transfer module is configured for moving containers among the first, second and third container support locations;

wherein the load port and the transfer module are each independently detachable from the processing tool;

wherein the first plate defines a width to accommodate only a single column of vertically aligned container support locations;

wherein said first plate and said second plate conform to a Box Opener/Loader to Tool Standard Interface; and wherein the second plate defines a width substantially similar to the width defined by the first plate.

15. The system as recited in claim 14, wherein said transfer module includes:

the second plate; and the container transport mechanism, including:

a carriage able to move vertically along the track;

an upper link arm having a first end and a second end, said first end rotatably coupled with said carriage;

a lower link arm having a first end and a second end, said first end rotatably coupled with said second end of said upper link arm; and a gripper rotatably coupled with said second end of said lower link arm.

16. The system as recited in claim 14, wherein said first access location includes:

a container advance plate for supporting a container and moving the container between a first position and a second position; and a port door for controlling access through said access port in said first plate.

* * * * *